July 23, 1929.  W. G. GRIBBEL  1,722,246
PROTECTING MEANS FOR GAS METERS
Filed April 29, 1927
FIG. I.
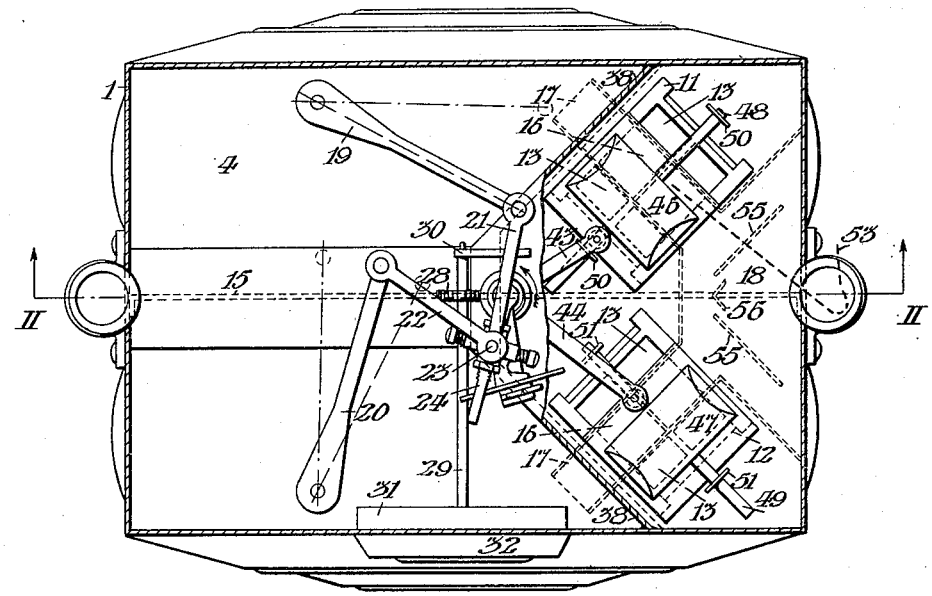
FIG. II.
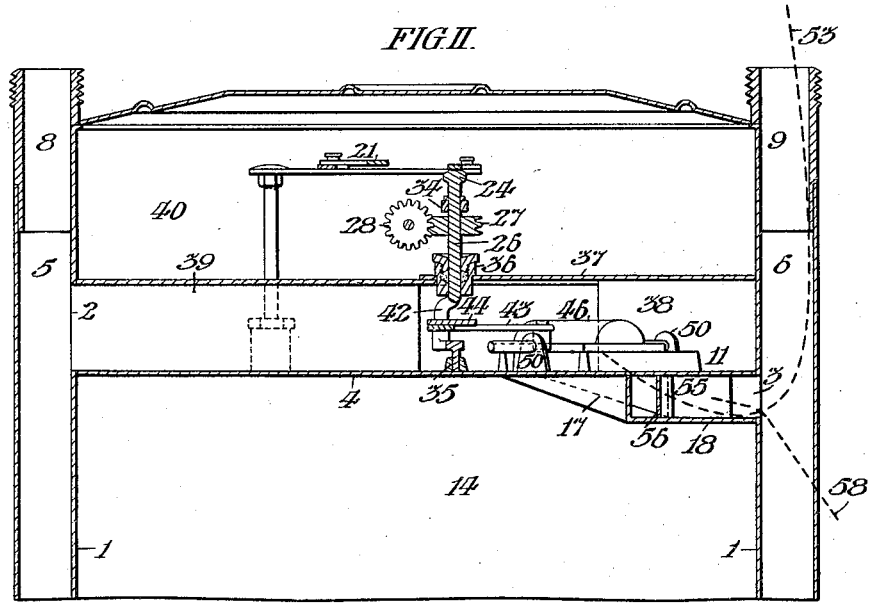
INVENTOR:
WAKEMAN GRIFFIN GRIBBEL, Patented July 23, 1929.

1,722,246

UNITED STATES PATENT OFFICE.

WAKEMAN GRIFFIN GRIBBEL, OF PHILADELPHIA, PENNSYLVANIA, ASSIGNOR TO AMERICAN METER COMPANY, OF PHILADELPHIA, PENNSYLVANIA, A CORPORATION OF DELAWARE.

PROTECTING MEANS FOR GAS METERS.

Application filed April 29, 1927. Serial No. 187,563.

My invention relates to a meter including a casing having a gas inlet and a gas outlet, and inclosing registering mechanism which is operated by two bellows coupled to a crank shaft, which crank shaft is arranged to operate two slide valves in alternation, which slide valves respectively control ports leading to and from said bellows, in communication with said gas inlet and gas outlet. The purpose of such mechanism is to register the amount of gas dispensed for which the user is required to pay.

Said gas inlet and gas outlet are upon respectively opposite sides of said casing and each provided with a tubular extension and respective pipe coupling members, exterior to said casing, whereby the meter may be connected with a gas main and a gas dispensing pipe. Ordinarily, such meters are made without any obstruction between the outlet pipe coupling and the valve which controls the passage of gas through that outlet. However, dishonest users of gas dispensed through such meters have discovered that it is possible to uncouple the outlet thereof, insert a bent wire through the outlet and channels connecting it with the valve so as to permanently uphold the outlet valve from its seat and thus permit the continual leakage of gas to said outlet without corresponding registration and thus such a user feloniously obtains a volume of gas in excess of that registered by the meter. In an effort to prevent such dishonest practices, it has been proposed to render the gas passage in such tubular extension exterior to the casing, and leading to the gas outlet coupling, tortuous, so that it is more difficult to insert a wire therethrough to displace the valve. However, such protective devices have been found to be insufficient.

Therefore, the object and effect of this invention is to provide baffle means, remote from and independent of the tubular extensions exterior to the gas meter casing and entirely within said casing, between the gas outlet and the valve controlling the same, arranged to prevent the introduction, to said casing, of any implement capable of displacing that valve.

My invention includes the various novel features of construction and arrangement hereinafter more definitely specified.

In said drawings; Fig. I is a partly sectional plan view of a gas meter embodying my invention; the top of the meter casing and a portion of the top of the valve box being removed.

Fig. II is a fragmentary vertical sectional view of said structure, taken on the line II, II in Fig. I.

In said figures; the thin sheet metal casing 1 has the gas inlet 2 and the gas outlet 3 respectively above and below the valve table 4, which is a horizontal partition of the full area of said casing. Said inlet and outlet are upon respectively opposite sides of said casing and respectively provided with tubular extensions 5 and 6 with respective pipe coupling members 8 and 9 exterior to said casing; whereby the meter may be connected with a gas main and a gas dispensing pipe, by ordinary union fittings.

Said table 4 has two valve seats 11 and 12, conveniently formed by castings which are set and soldered therein so as to each afford two inlet ports 13 opening through said valve table 4 into the bellows compartments 14 below said table of which there are two, separated by a vertical partition 15 between said valve seats. Said ports 13 are upon respectively opposite sides of respective central ports 16 which open through said valve table 4 into the respective fork channels 17, which lead into the box channel 18 which is common to both of said fork channels 17 and in communication with said gas outlet 3.

Said bellows compartments 14 respectively include separate bellows which are alternately supplied with gas through the ports 13 in said valve seats 11 and 12 respectively. Said bellows are respectively provided with lever arms 19 and 20 which have a range of angular movement indicated by the dot and dash lines in Fig. I. Said arms 19 and 20 are respectively pivotally connected to links 21 and 22 and said links are both pivotally connected to the crank stud 23 which is mounted upon the crank 24 which is fixed upon the top of the crank shaft 26. The arrangement is such that the pressure of gas flowing through the meter alternately distends said bellows to turn said crank shaft 26 in the direction of the arrow in Fig. I. Said shaft has, rigidly mounted thereon, the worm 27 which engages the worm wheel 28 on the register shaft 29. Said shaft 29 is journaled in the stationary bracket 30 and in the frame 31 which incloses the registering mechanism comprising a train of gears of ordinary construction and which is so arranged as to rotate a series of radial index pointers in conjunction with dials in the indicator 32, to indicate the volume of gas dispensed.

Said crank shaft 26 is journaled in the bracket 34 and in the step bearing 35 and extends through the stuffing box 36 in the cover plate 37 of the valve box 38, which box is conveniently formed in one piece with the gas inlet conduit 39 which is soldered to said table 4; so that the gas flowing into the meter casing through said inlet 2 is excluded from the crank compartment 40 above said conduit 39 and valve box 38.

Said crank shaft 26 has the crank 42 pivotally connected with the respective links 43 and 44, which are respectively pivotally connected with the slide valves 46 and 47 which are fitted to reciprocate upon the respective valve seats 11 and 12 and provided with slide bars 48 and 49 which extend through bearing brackets 50 and 51 which are rigidly connected with said valve table 4 and project upwardly therefrom.

The mechanism above described operates as follows: Said meter being connected by its inlet coupling 8 and outlet coupling 9 with a piping system through which gas is to be dispensed, said mechanism remains stationary until a gas vent is afforded in communication with said outlet 3. Thereupon, the gas flows through the meter and is alternately admitted to and expelled from the two bellows, causing the alternate expansion and collapse thereof, with the result that said crank shaft 26 is continuously rotated in the direction of the arrow shown in Fig. I to operate the registering mechanism by the shaft 29 and, incidentally, to operate the valve mechanism which controls the passage of gas to and from said bellows chambers 14 and thence through the branch channels 17.

Of course, if either of said valves 46 or 47 be upheld from its seat, the gas which otherwise is compelled to pass through the bellows and be measured before being dispensed by way of the branch channels 17, is permitted to pass directly from the valve box 38 into said branch channels and thence through the outlet 3 to be consumed, without being measured and, consequently, without charge to the consumer. As above contemplated, that result may ordinarily be attained by forcing a bent wire 53 downwardly through the outlet coupling 9 and outlet 3 and thence up through the branch channel 17, as indicated by the heavy dotted line in Fig. II, thus permanently uplifting the local valve 46 or 47 from its seat, without interfering with the subsequent operation of the meter mechanism.

However, in accordance with my invention, such felonious manipulation of the meter mechanism is prevented by providing baffle means, entirely within the casing 1, independent of the tubular extension 6 but in position to obstruct and prevent the passage of the wire 53 into either of said branch channels 17. Such baffle means might consist of a single vertical partition in the box channel 18, but it was found that a single partition of the necessary extent would materially reduce the normal flow of gas through the meter. Therefore, I prefer to provide three vertical baffle partitions in said box channel, to wit, two similar baffle partitions 55 which are respectively interposed between the branch channels 17 and the outlet 3; and a third partition 56 which is interposed between said other baffle members 55 and said outlet 3; said baffle members 55 being plane and said baffle member 56 being angular, in plan view, as indicated in Fig. I. Such construction and arrangement permits the gas to flow around both vertical edges of each baffle partition 55 with a negligible impedance of its normal flow as compared with a meter which is not provided with any such baffle means.

It may also be observed that such baffle means being located entirely within the meter casing 1 also serve to prevent the introduction of a wire through the box channel in the direction indicated by the heavy dotted line 58 in Fig. II which might be effected if the baffle means were located upon the exterior of said casing between the outlet 3 and the couple 9, as proposed in Letters Patent of the United States 1,605,447 granted to Henry Klippel November 2, 1926. Therefore, I disclaim such baffle means, exterior to the meter casing, as claimed in said Letters Patent.

However, I do not desire to limit myself to the precise details of construction and arrangement of the meter mechanism or of the baffle means herein set forth, as it is obvious that various modifications may be made therein without departing from the essential features of my invention, as defined in the appended claims.

I claim:

1. In a gas meter, the combination with a casing having a gas inlet and a gas outlet and a gas passageway between them; of a valve within said casing, arranged to control the passage of gas through said outlet; and baffle means, entirely within said casing, extending completely across said passageway between said outlet and said valve, arranged to prevent introduction, through said outlet, of any implement capable of displacing said valve; whereby said valve is protected from felonious attack.

2. In a gas meter, the combination with a casing having a gas inlet and a gas outlet and a gas passageway between them, upon respectively opposite sides thereof, each provided with a tubular extension and respective pipe coupling members, exterior to said casing; of a valve in said casing, arranged to control the passage of gas through said outlet; and baffle means, remote from, and independent of, said tubular extensions, and entirely within said casing, extending completely across said passageway between said outlet and said valve, arranged to prevent the introduction, through said outlet, of any implement capable of displacing said valve; whereby said valve is protected from felonious attack.

3. In a gas meter, the combination with a casing, having a valve table intermediate of its height, and a gas inlet and a gas outlet respectively above and below said table; two valve seats on said table; fork channels leading respectively from said valve seats, below said table, a box channel common to both of said fork channels, and in communication with said outlet; and baffle means in said box channel extending completely across each of said fork channels, and arranged to prevent the introduction through said outlet, of any implement capable of displacing either of said valves; whereby said valves are protected from felonious attack.

4. In a gas meter, the combination with a casing, having a valve table intermediate of its height, and a gas inlet and a gas outlet; two valve seats on said table; fork channels leading respectively from said valve seats; a box channel common to both of said fork channels, and in communication with said outlet; and baffle means, including vertical partition members in said box channel respectively interposed between said outlet and said fork channels extending completely across each of said fork channels, and arranged to prevent the introduction through said outlet, of any implement capable of displacing either of said valves; whereby said valves are protected from felonious attack.

5. In a gas meter, the combination with a casing, having a valve table intermediate of its height, and a gas inlet and a gas outlet respectively above and below said table; two valve seats on said table; fork channels leading respectively from said valve seats, below said table, a box channel, below said table, common to both of said fork channels, and in communication with said outlet; and baffle means, including vertical baffle partition members in said box channel respectively interposed between said outlet and said fork channels, and a third baffle partition member in the space between said outlet and said other baffle members and in spaced relation therewith, affording a gas passage between said baffle members but arranged to prevent the introduction through said outlet, of any implement capable of displacing either of said valves; whereby said valves are protected from felonious attack.

6. In a protection means for gas meters of the class specified, the combination with the usual valves, diaphragms and cooperating mechanism between the diaphragms and valves and the registering mechanism, of a pipe communicating with the interior of the meter, forked channels leading to the valves and providing communication between said valves and the pipe, and means extending completely across at a distance from the outer open portions of the forked channels for preventing insertion of a device through the pipe and channels to reach the valves for the purpose of nefariously raising the latter.

7. In a protection means for a gas meter of the class specified, the combination with controlling valves, diaphragms and mechanism between the valves and diaphragms and registering means, of a gas flow pipe having a portion thereof communicating with the interior of the meter, forked channels between the valves and the said pipe and having an enlarged juncture chamber at the outer portions thereof, said chamber having angularly disposed side walls and occluding means disposed in said juncture chamber and extending completely across and covering direct entrance into the outer open ends of the forked channels to obstruct the introduction of a device into either channel for the purpose of nefariously raising either valve to permit gas to irregularly pass into the pipe.

In testimony whereof, I have hereunto signed my name at Philadelphia, Pennsylvania, this 12th day of April, 1927.

WAKEMAN GRIFFIN GRIBBEL.